United States Patent
Schmidt et al.

[19]

[11] Patent Number: 6,153,312
[45] Date of Patent: Nov. 28, 2000

[54] APPARATUS AND METHODS FOR ECONOMICALLY FABRICATING MOLDED REFRACTORY ARTICLES USING REFRACTORY MIX DISPLACING ELEMENTS

[75] Inventors: Kris Schmidt, Granada Hills; Charles W. Hull, Santa Clarita, both of Calif.; Paul F. Jacobs, Saunderstown, R.I.

[73] Assignee: 3D Systems, Inc., Valencia, Calif.

[21] Appl. No.: 09/096,963

[22] Filed: Jun. 12, 1998

[51] Int. Cl.[7] ...................................................... B28B 7/00
[52] U.S. Cl. ............................ 428/568; 428/469; 428/67; 428/294.4; 249/134
[58] Field of Search ............................. 428/469, 67, 702, 428/294.4, 568; 249/134, 117

[56] References Cited

U.S. PATENT DOCUMENTS

| | | |
|---|---|---|
| 3,823,002 | 7/1974 | Kirby et al. . |
| 3,892,907 | 7/1975 | Niimi et al. . |
| 3,900,667 | 8/1975 | Moens . |
| 3,914,500 | 10/1975 | Brennan et al. . |
| 3,929,476 | 12/1975 | Kirby et al. . |
| 4,327,156 | 4/1982 | Dillon et al. . |
| 4,373,127 | 2/1983 | Hasket et al. . |
| 4,431,449 | 2/1984 | Dillon et al. . |
| 4,455,354 | 6/1984 | Dillon et al. . |
| 4,469,654 | 9/1984 | Hasket et al. . |
| 4,478,904 | 10/1984 | Ducheyne et al. . |
| 4,491,558 | 1/1985 | Gardner . |
| 4,554,218 | 11/1985 | Gardner et al. . |
| 5,507,336 | 4/1996 | Tobin . |
| 5,989,476 | 11/1999 | Lockard et al. . |

OTHER PUBLICATIONS

U.S. application No. 60/079,847, Charles W. Hull et al., filed Mar. 27, 1998, and titled "Molding Method, Apparatus, and Device Including Use of Powder Metal Technology For Forming a Molding Tool with Thermal Control Elements".

*Primary Examiner*—Deborah Jones
*Assistant Examiner*—Jennifer McNeil
*Attorney, Agent, or Firm*—Louis A. Mok; Ralph D'Alessandro

[57] ABSTRACT

A method is disclosed for making a molded refractory article comprising the steps of providing a mold including a molding pattern, the mold and molding pattern defining a mold cavity; filling the mold cavity around the molding pattern with a mixture comprising refractory particles and a heat fugitive binder; inserting a plurality of elements of relatively high melting point material into the mixture to displace a portion of the mixture; curing the mixture; separating the mold and molding pattern from the cured mixture; and sintering the combination of the cured mixture and mixture displacing elements to provide a reinforced molded refractory article. The mixture displacing elements preferably comprise a plurality of parallel tool steel rods. Also disclosed is an apparatus for molding the aforedescribed reinforced refractory article.

5 Claims, 5 Drawing Sheets

APPARATUS AND METHODS FOR ECONOMICALLY FABRICATING MOLDED REFRACTORY ARTICLES USING REFRACTORY MIX DISPLACING ELEMENTS

BACKGROUND OF THE INVENTION

1. Field of the Invention

The present invention relates to apparatus and methods for economically forming precision molded articles from mixes of refractory particles and heat fugitive organic binders.

2. Description of the Prior Art

Although it will be evident that the present invention has broad utility and can be used to form many kinds of molded refractory articles, the invention and its background will be described principally in the context of the fabrication of inserts for plastic injection molds.

Techniques for molding sintered metal articles from mixes of refractory particles or powders and heat fugitive organic binders have long been known. Such techniques can be used, for example, to make sintered metal core and cavity inserts for durable injection molds capable of producing millions of plastic injection molded parts. In a typical process currently in use, a flexible molding material such as RTV (room temperature vulcanized) silicone rubber is poured around a master pattern and allowed to cure. Once the RTV has cured, the master pattern is removed and a mixture of refractory metal particles (for example, $A_6$ tool steel particles and tungsten carbide particles) and a heat fugitive organic binder (for example, epoxy liquid) is poured into the RTV mold and allowed to cure. The cured mixture, or green article, is removed from the RTV mold, heated to burn off the binder and tack the refractory particles, sintered and then infiltrated with a low melting point infiltrant such as copper. The result is a metal composite refractory article having both high hardness and high impact strength making the technique useful for producing tooling such as a plastic injection mold insert, referred to herein as an "infiltrated powdered metal composite tooling insert" or "IPMCTI". Production and use of tooling formed using powder metal technology are known in the art. Examples of techniques for such production and use are disclosed in the following U.S. Patents that are each herein incorporated by reference in their entirety:

(1) U.S. Pat. No. 3,823,002, entitled "Precision Molded Refractory Articles," issued July 1974 to Kirby et al.

(2) U.S. Pat. No. 3,929,476, entitled "Precision Molded Refractory Articles and Method of Making," issued December 1975 to Kirby et al.

(3) U.S. Pat. No. 4,327,156, entitled "Infiltrated Powdered Metal Composites Article," issued April 1982 to Dillon et al.

(4) U.S. Pat. No. 4,373,127, entitled "EDM Electrodes," issued February 1983 to Hasket et al.

(5) U.S. Pat. No. 4,432,449, entitled "Infiltrated Molded Articles of Spherical Non-Refractory Metal Powders," issued February 1984 to Dillon et al.

(6) U.S. Pat. No. 4,455,354, entitled "Dimensionally-Controlled Cobalt Containing Precision Molded Metal Article," issued June 1984 to Dillon et al.

(7) U.S. Pat. No. 4,469,654, entitled "EDM Electrodes," issued September 1984 to Hasket et al.

(8) U.S. Pat. No. 4,491,558, entitled "Austenitic Manganese Steel Containing Composite Article," issued January 1985, to Gardner.

(9) U.S. Pat. No. 4,554,218, entitled "Infiltrated Powdered Metal Composite Article," issued November 1985, to Gardener et al.

(10) U.S. Pat. No. 5,507,336, entitled "Method of Constructing Fully Dense Metal Molds and Parts," issued to Tobin.

Although the described technique is relatively straightforward, it has several shortcomings in the fabrication of molds, tooling, tooling inserts, usable articles, or full size prototype devices:

First, the effective cost per cubic mm of an IPMCTI is many times greater than that of an insert made from conventional tool steel. For especially small inserts (for example, 25–75 cu. mm) this difference in material cost is not significant relative to set-up charges or incremental charges associated with increased speed of delivery. However, for larger inserts (for example, 250 cu. mm and greater), the material cost penalty for the entire tool (core and cavity) becomes substantial and the process becomes far less economically attractive. In particular, the mixture of refractory particles and binder can be a significant part of the costs to prepare a final part.

Second, the green article shrinks appreciably during sintering and infiltrating. Such shrinkage may be nonuniform when sections of significantly different thicknesses exist in an article, and especially when such sections share a common intersection; nonuniform shrinkage often results in part distortion and decreased precision of the article.

Third, the green article is relatively fragile and is therefore subject to breakage during demolding with consequent decreases in process yield. This is especially a problem with larger parts. The articles in their final, sintered state are also subject to breakage.

Accordingly, it is an object of the present invention to reduce the cost per unit volume of molded refractory articles.

It is another object of the present invention to reduce shrinkage and especially nonuniform shrinkage and the resulting distortion and decreased precision of molded refractory articles.

It is still a further object of the present invention to increase the strength of molded refractory articles both in the green state, sintered state and in the optionally final, infiltrated state.

It is a further object of the invention to pursue the above and other objects, which will be apparent from the instant disclosure, alone and in various combinations.

SUMMARY OF THE INVENTION

In accordance with one specific, exemplary embodiment of the invention, there is provided a method for making a molded refractory article such as an IPMCTI comprising the steps of providing a mold including a molding pattern, the mold and molding pattern defining a mold cavity; filling the mold cavity around the molding pattern with a mixture comprising refractory particles and a heat fugitive binder; inserting a plurality of elements of relatively high melting point material into the mixture to displace a portion of the mixture; curing the mixture; separating the mold and molding pattern from the cured mixture; and sintering the combination of the cured mixture and mixture displacing elements to provide the molded refractory article. Preferably, the mixture displacing elements are made of tool steel and comprise a plurality of parallel rods. These rods may be in contact with one another, but are more preferably spaced apart. Still further, the mold includes a bottom wall and the molding pattern includes an outer surface, and each rod has a lower end, which may be tapered, the ends of the inserted rods being in close proximity to, but not in contact with, the bottom wall and outer surface of the molding pattern.

In accordance with another aspect of the present invention, there is provided an apparatus for molding a refractory article such as an IPMCTI from a mix comprising refractory particles and a heat fugitive binder, in which the apparatus includes a mold comprising upright side walls, a bottom wall and a molding pattern within the confines of the walls, the walls and molding pattern defining a mold cavity for receiving the mix; a support member disposed above the mold cavity; and at least one mix displacement element carried by the support member, the at least one displacement element being adapted to project into the mold cavity for displacing a portion of the mix. Further in accordance with this aspect of the invention, each rod is adjustably positionable relative to the support member so that the length of the portion of the rod projecting into the mold cavity may be adjusted. The mold includes an upper edge extending about the mold cavity and the support member is adapted to be supported by the upper edge of the mold. Still further, a spacer carried by the upper edge of the mold is adapted to be interposed between the upper edge of the mold and the support member so as to form a gap between the lower ends of the rods and the adjacent mold wall or molding pattern surface.

The invention results in the following advantages either singly or in combination:

1. Reduced cost: Currently, the entire volume of a molded refractory article is generated using relatively expensive refractory mix. Employing the present invention, a significant fraction of the volume of the article is fabricated using substantially lower cost conventional tool steel refractory mix displacement elements which may take various forms but which preferably comprise rods. In the case of an IPMCTI, the smaller volume of the substantially more expensive refractory mix is employed mainly to generate the critical geometry of the active tooling surface, as well as the interstitial volume between the mix displacement elements.
2. Improved accuracy: Since the total volume of refractory mix undergoing shrinkage is substantially reduced, the overall process shrinkage is also reduced, leading to improved accuracy of the green and final articles.
3. Enhanced process yield: At present, a significant fraction of all molded refractory articles are destroyed due to breakage in the green state. Since tool steel is much stronger than a green refractory article, breakage is reduced, resulting in improved process yield.
4. Reduced bowing distortion: The increased strength of the steel rods serves to reduce distortion of the green refractory article.

These advantages are particularly significant in the fabrication of IPMCTI's.

BRIEF DESCRIPTION OF THE DRAWINGS

Further objects, features and advantages of the invention will become evident from the ensuing detailed description when taken in conjunction with the accompanying drawings in which.

DETAILED DESCRIPTIONS OF THE PREFERRED EMBODIMENTS

It is to be understood that the preferred embodiments described herein merely exemplify the invention which may take forms different from the specific embodiments described.

Figure 1:
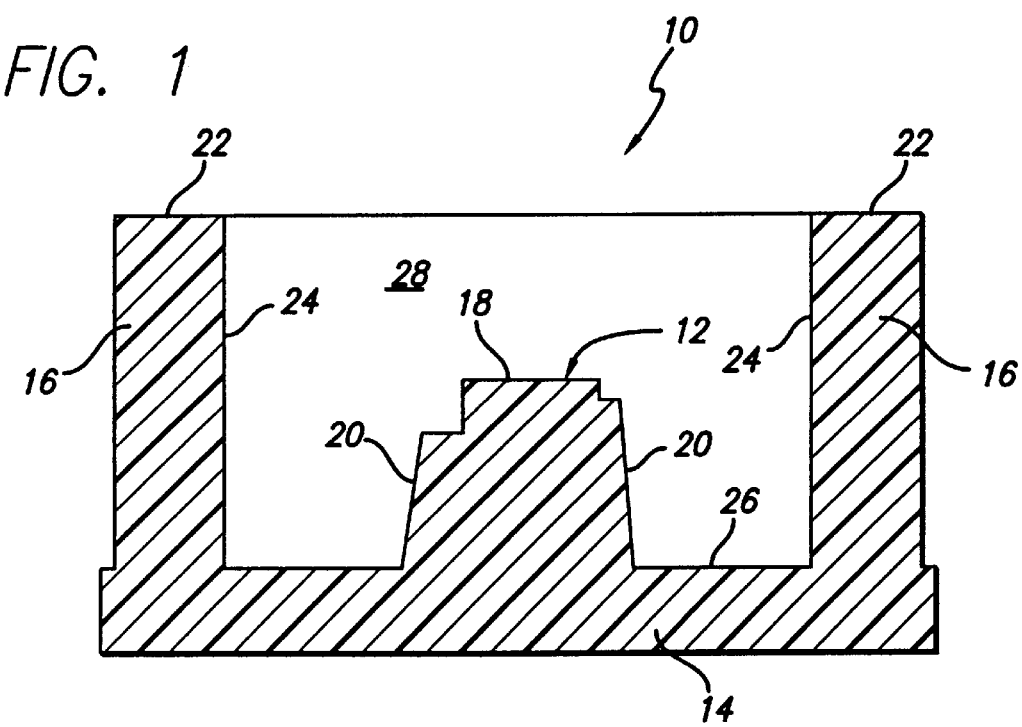
FIG. 1 is a side elevation view, in cross section, of a mold for forming a molded refractory article such as an IPMCTI in accordance with one embodiment of the present invention.

With reference first to FIG. 1, there is shown a mold 10 comprising generally a positive or molding pattern 12 of the part to be ultimately fabricated by plastic injection molding; a base plate 14 carrying the pattern 12; and up right sidewalls 16. The molding pattern 12 may intentionally be generated slightly oversized to allow for the finite shrinkage occurring in the refractory forming and plastic injection molding processes. In accordance with the specific, preferred embodiment shown in FIG. 1, the mold 10 is fabricated as a unitary, one-piece structure from, for example, RTV silicon rubber combined with well known rapid prototyping and manufacturing techniques, such as stereolithography techniques, selective deposition modeling techniques or laminated object manufacturing techniques. In accordance with one such technique, a stereolithographic pattern of the core and cavity insert appropriately dimensioned for shrinkage compensation may be used as a master pattern about which the RTV silicone mold 10 is poured and allowed to cure.

Stereolithography and other Rapid Prototyping and Manufacturing technologies are described directly in the following U.S. patents and applications or indirectly through references incorporated therein by reference. The following listed patents and patent applications are fully incorporated herein by reference as if set forth in full:

U.S. Pat. No. 4,575,330 to Hull, describes some fundamental elements of stereolithography.

U.S. Pat. No. 5,321,622 to Snead et al., describes various techniques for manipulating three-dimensional object data to produce cross-sectional data for use in forming three-dimensional objects.

U.S. Patent Application Ser. No. 08/722,335, by Thayer et al., filed Sep. 27, 1996, now abandoned; and U.S. Pat. No. 5,943,235, to Earl et al. describe various issues related to the production of three-dimensional objects according to the principles of selective deposition modeling.

U.S. Pat. No. 5,965,029 Allison et al., describes various techniques for solidifying layers of material sometimes known as build styles.

U.S. Pat. No. 5,902,538 Kruger et al., discloses simplified exposure and coating techniques for forming 3D objects to overcome minimum coating depth limitations. Furthermore, this patent application describes various RP&M technologies that can be used in the production of three-dimensional objects and supplies basic patent information associated with these various technologies.

The various RP&M technologies and some associated applications are described in the following two books which are incorporated by reference as if set forth in full herein: (1) *Rapid Prototyping and Manufacturing: Fundamentals of Stereolithoaraphy*, by Paul Jacobs, published by the Society of Manufacturing Engineers, Dearborn, Mich.; 1992; and (2) *Stereolithography and other RP&M Technologies: from Rapid Prototyping to Rapid Tooling;* by Paul Jacobs; published by the Society of Manufacturing Engineers, Dearborn, Mich.; 1996.

The stereolithography process typically forms objects from photoset materials that typically do not melt when heated. As such, if a stereolithography pattern is used as the master pattern, separation of the stereolithography pattern from the molded refractory mix may occur through oxidation (i.e. burning), reduction, or by mechanical means such as through the use of an intermediate or even interim RTV mold.

Current commercial Selective Deposition Modeling (i.e. SDM) techniques typically use thermoplastic materials that can be melted. As such, removal of master patterns formed from SDM techniques can occur by the most convenient of melting, reduction, oxidation, or mechanical techniques.

The other rapid prototyping technologies such as selective laser sintering, laminated object manufacturing, three-dimensional printing may use materials that either melt, oxidize and/or reduce. It is within the skill of the art to determine the most appropriate manner of removing a master pattern based on the material the pattern is formed from and the conditions surrounding the removal.

Tooling production is described in "*Plastic Injection Molding . . . manufacturing process fundamentals*", by Douglas M. Bryce, which was published in 1996 as Volume 1 of a series entitled "Fundamentals of Injection Molding" by the Society of Manufacturing Engineers, Dearborn, Mich. The entire disclosure of this publication is incorporated herein by reference as if set forth in full herein. In particular, this publication discloses main components of a molding machine on pages 11–27. Parameters associated with the molding process are addressed on pages 29–66. In particular, temperature control issues are addressed on pages 30–37. Optimization of mold parameters is addressed on pages 67–120. In particular, optimization of temperature is addressed on pages 78–93 wherein, among other things, cooling channels, cascades, and cooling pins are discussed. Pages 139–150 address basic issues associated with mold operation and design. Pages 195–218 address testing and failure analysis of the molded objects. Pages 219–253 address trouble-shooting techniques for molding problems.

As seen in FIG. 1, the height of the side walls 16 substantially exceeds that of the molding pattern 12 so that the pattern 12 is contained well within the confines of the walls 16. The pattern 12 shown in the drawings is, of course, merely representative; any part geometry may be created in CAD with the usual attention paid to draft, parting lines, and so forth. The exemplary pattern 12 shown in FIG. 1 includes an upper, shaped surface 18 and side surfaces 20 having positive draft.

As an alternative to the unitary structure shown, a master pattern 12, made separately, may be added to the base 14 using any of several methods including mechanically attaching the pattern 12 to the base 14 using fasteners or adhesive, or inserting a projection on the pattern 12 into a pocket in the base. The base 14 and walls 16 may all be made as separate elements from aluminum, steel or plastic appropriately joined together. The cross-section of the base 14 is preferably square or rectangular but may be circular or any arbitrary shape.

The side walls 16, which are sufficiently thick to resist deformation resulting from the pressure of the refractory mix to be poured into the mold, have flat coplanar upper edges 22 and interior vertical surfaces 24. The base plate 14 has an interior surface 26. The exterior surfaces 18 and 20 of the molding pattern 12 and the interior surfaces 24 and 26 of the side walls 16 and base plate 14 define a mold cavity 28 which in subsequent steps receives the refractory mix.

Figure 2:
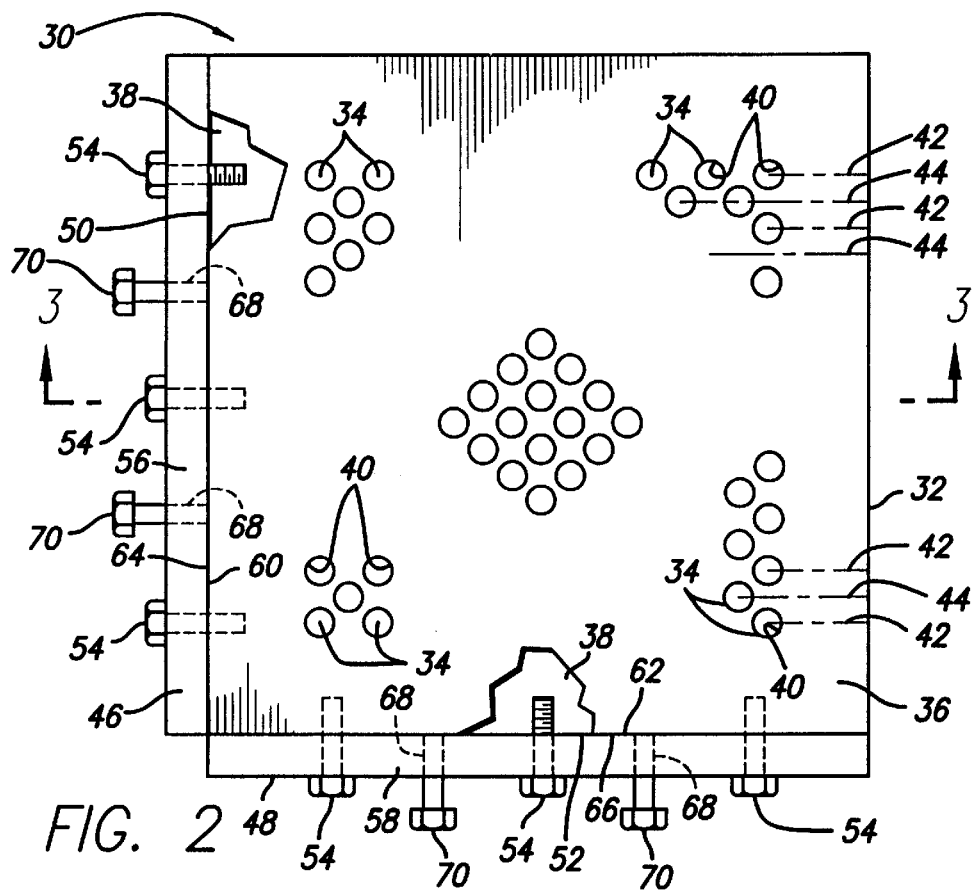
FIG. 2 is a top plan view of a support for carrying a plurality of refractory mix displacing elements in accordance with an aspect of the present invention.
Figure 3:
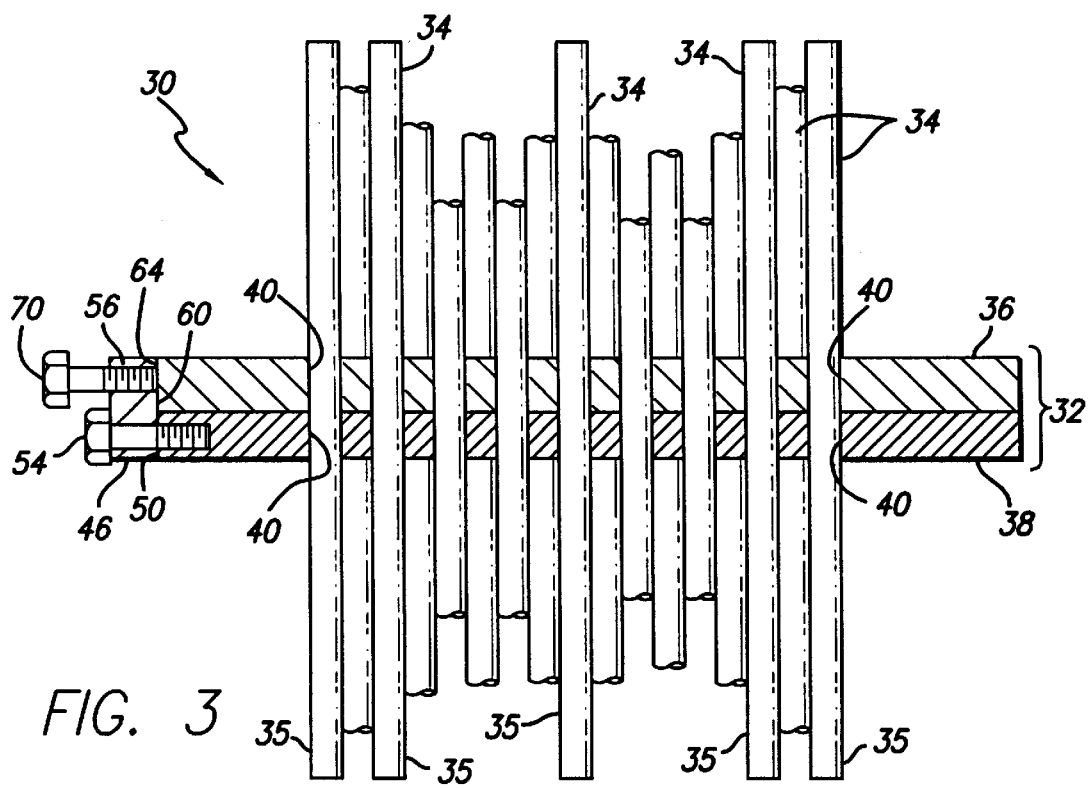
FIG. 3 is a side elevation view, in cross section, of the support and displacing elements of FIG. 2, as seen along the line 3—3 in FIG. 2.

FIGS. 2 and 3 show an assembly 30 including a displacement element support structure 32 carrying a plurality of refractory mix displacement elements which in the example shown comprise parallel rods 34 each having a lower end 35. The rods are preferably made of a relatively high melting point steel or steel alloy such as $A_6$ tool steel. The support structure 32 is reusable and includes a pair of matching, stacked, square, upper and lower plates 36 and 38, respectively, provided with a matrix of closely spaced, precision machined holes 40 each of which extends vertically through both plates and is dimensioned to receive a rod 34. In the specific embodiment under consideration, parallel rows 42 of nine equally spaced holes 40 are alternated with parallel rows 44 of eight equally spaced holes 40 offset from the holes in rows 42. Further by way of example and not limitation, each hole 40 has a diameter of about 3 mm and the holes 40 are drilled at uniform intervals of about 6 mm in the matching plates 36, 38. A total of 145 holes 40, extending through both plates 36, 38 are thus provided in accordance with this example, each hole receiving a steel rod 34 having, by way of example and not limitation, a diameter of about 3 mm and a length of about 25 mm. Moreover, the outer surface of each rod 34 may be roughened or otherwise textured to enhance bonding between the rod surface and the refractory mix. In addition, the lower end 35 of the parallel rods 34 may be tapered or otherwise configured to reduce stress in the refractory article/steel rod composite.

To align corresponding holes in the upper and lower plates 36 and 38, registration bars 46 and 48 are mounted along an adjoining pair of edges 50 and 52 of the lower plate 38. The bars 46 and 48 may be secured to the edges 50, 52 of the plate 38 in any convenient fashion; a plurality of bolts 54 are used in the preferred embodiment. The bars 46 and 48 include upwardly projecting portions 56 and 58, respectively, having inner registration surfaces 60 and 62 for engagement by corresponding, adjoining pair of edges 64 and 66 of the upper plate 36. The upwardly projecting portions 56 and 58 of the bars 46 and 48 are provided with threaded holes 68 for receiving clamping screws 70 whose inner ends are adapted to engage the adjoining edges 64 and 66 of the upper plate 36. It will thus be seen that the rods 34 inserted in the holes 40 extending through the plates 36 and 38 can be adjustably positioned vertically relative to the plates and clamped in place by tightening the clamping screws 70.

Figure 5:
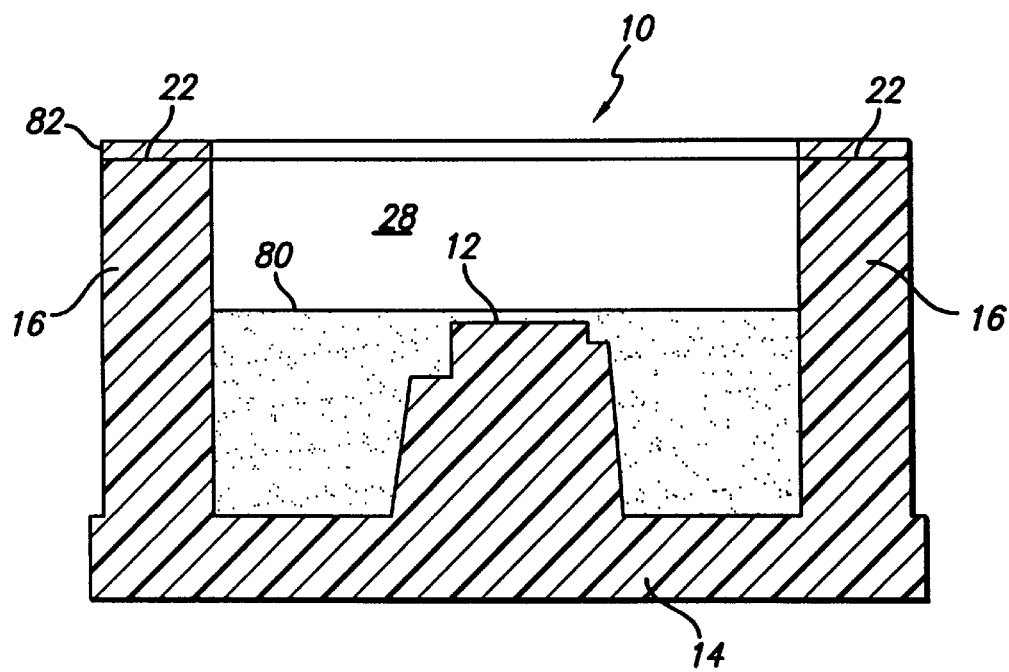
FIG. 5 is side elevation view, in cross section, of the mold of FIG. 1 partially filled with green refractory mix illustrating another step in the fabrication process of the present invention.
Figure 4:
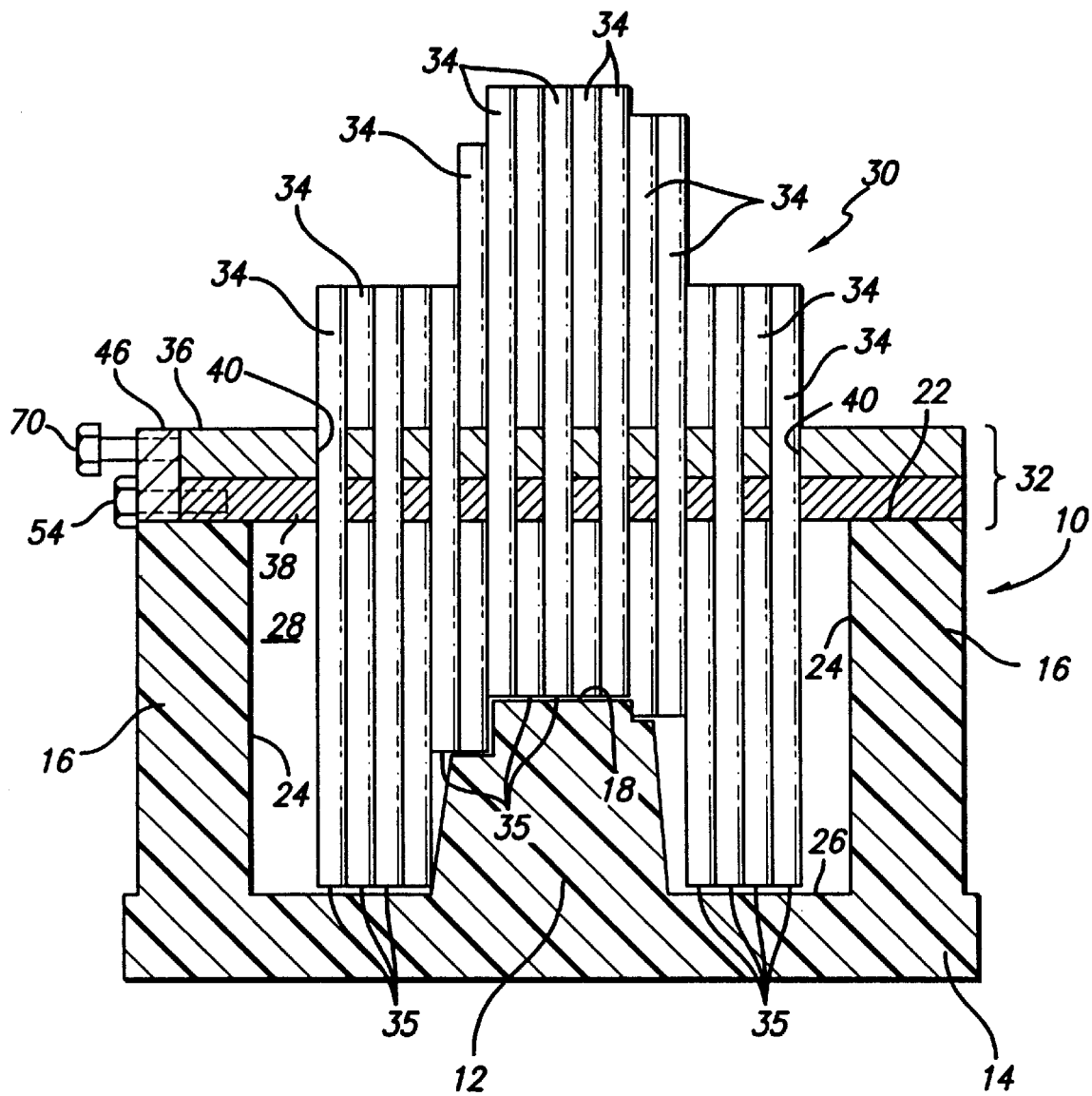
FIG. 4 is a side elevation view, in cross section of a mold assembly comprising the mold of FIG. 1 and the support and displacing elements of FIGS. 2 and 3 illustrating one of the steps of a method for fabricating a molded refractory article in accordance with the present invention.
Figure 6:
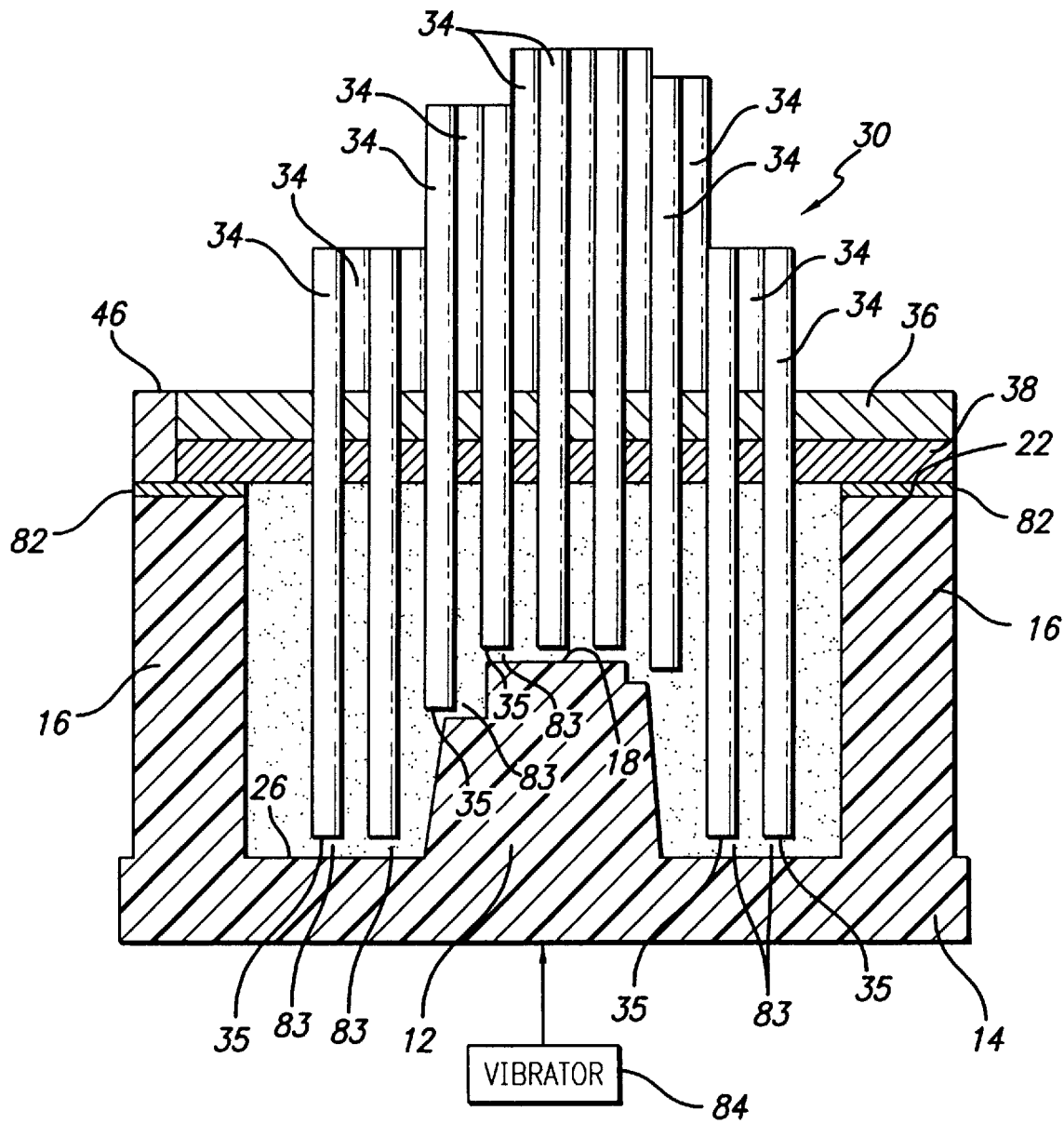
FIG. 6 is a side elevation view, in cross section, of the mold apparatus of the invention illustrating a stage in the molded refractory article fabrication process in which the refractory mix displacing elements have been inserted into the refractory mix to partially displace the mix.
Figure 7:
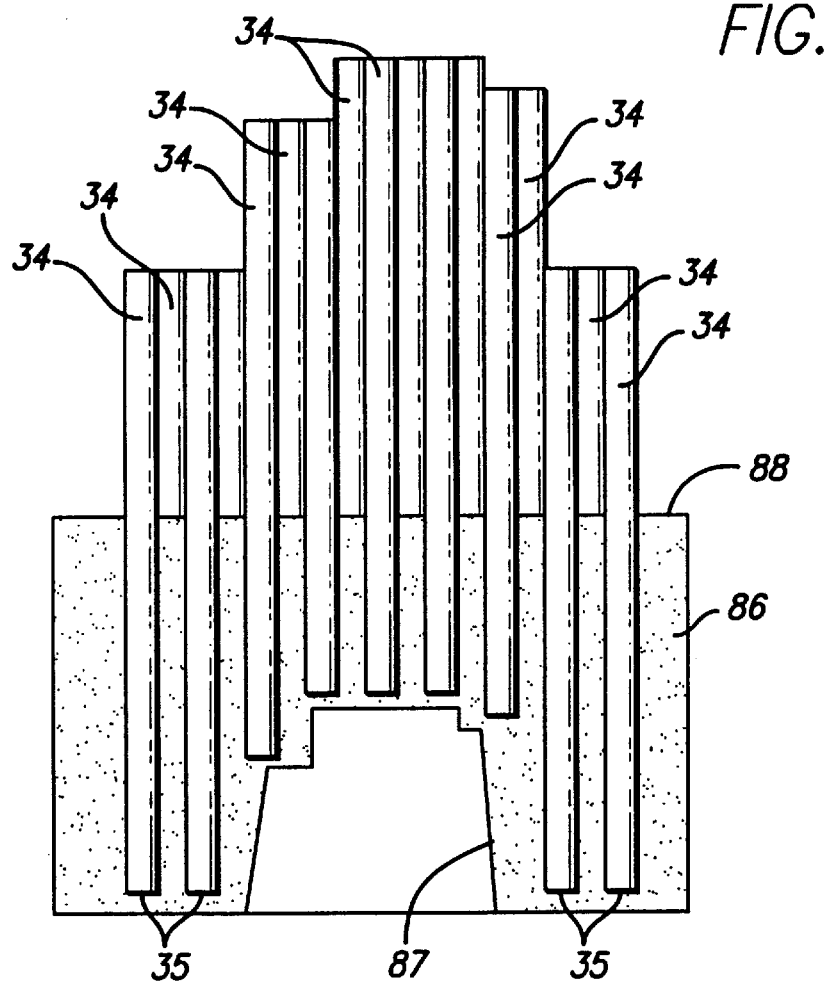
FIG. 7 is a side elevation view, in cross section, of a green refractory article after it has been separated from the mold.
Figure 8:
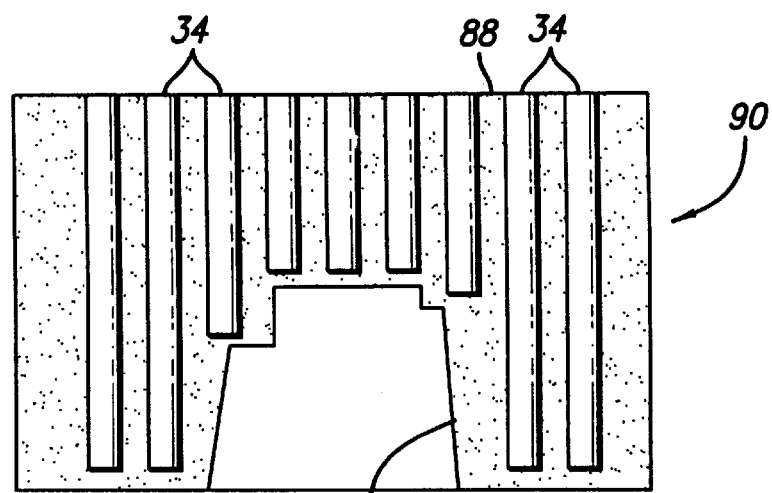
FIG. 8 is a side elevation view, in cross section, of the green refractory article of FIG. 7 after the refractory mix displacing elements have been trimmed and before the binder is burned off and the article sintered and infiltrated.

Turning now to FIG. 4, with the support structure 32 resting on the upper edges 22 of the mold side walls 16, and with the clamping screws 70 loosened to allow the rods 34 to be vertically adjusted relative to the plates 36, 38, the rods are pushed down until their ends 35 contact the interior surface 26 of the base plate 14 and the outer surfaces of the molding pattern 12. When all of the rods 34 have been properly positioned so that their lower ends 35 touch either the base plate 14 or the molding pattern 12, the clamping screws 70 are tightened, tending to slide the upper plate 36 horizontally relative to the lower plate 38, such scissor-like action being resisted by the rods 34, thereby securely clamping the rods and fixing their vertical position relative to the plates. The support structure and rod assembly 30 is then lifted off the mold 10 and, with reference to FIG. 5, the mold cavity 28 is partially filled with a refractory mix 80 comprising a mixture of refractory particles and a heat fugitive organic binder. The binder is preferably a thermosetting plastic, such as an epoxy, but, as is well known in the art, may comprise a thermoplastic such as paraffin. The remaining, unfilled volume of the mold cavity 28 is approximately equal to the volume of the portions of the refractory mix displacement rods 34 to be inserted into the mix. Next, a spacer 82 having a thickness ranging, for example, from about 2 mm to about 10 mm, is placed on the upper edge 22 of the mold. With reference now to FIG. 6, the assembly 30, with the rods 34 securely clamped in place, is positioned over the mold cavity 28 and the lower portions of the rods 34 are gently pushed down into the refractory mix 80 to displace the mix until the lower plate 38 engages the spacer 82. Accordingly, substantially uniform gaps 83 approximately equal to the thickness of the spacer 82 will separate the lower ends 35 of the rods 34 from the inner surface 26 of the lower wall 14 and the outer surfaces of the molding pattern 12. Further, the thickness of the refractory mix adjacent the outer surfaces of the molding pattern (which surfaces define the active tool surface in the final article) is relatively uniform, and hence less subject to non-uniform shrinkage induced distortion, with consequent improvement in IPMCTI dimensional accuracy. The insertion of the rods 34 into the refractory mix 80 may be facilitated by vibrating the mold and/or rods using a vibrator 84 applied to the base plate 14 or to the assembly 30. The mold 10 may be additionally vibrated under vacuum before and/or after insertion of the rods 34 for a short period to remove any residual air bubbles from the mix 80. Use of vibration during insertion was found to be useful as it helps fluidize the mix, thereby aiding insertion of the rods. It is within the skill in the art to determine the appropriate vibration frequency and amplitude in order to achieve easier insertion of the rods. Next, the refractory mix 80 is cured. This curing may occur at a moderately elevated temperature of, for example, about 100° F. The clamping screws 70 are then loosened, the plates 36 and 38 are removed from the rods 34 and the green refractory article/steel rod composite 86 (FIG. 7) is separated from the RTV mold 10, thereby defining an insert cavity 87 whose surfaces conform to those of the molding pattern 12. The rods 34 provide a secure grip for facilitating the extraction of the green composite 86 from the mold. The excess lengths of the rods 34 may then be trimmed, for example, by sawing, flush with the surface 88 of the composite 86, which surface becomes the mounting surface of the finished IPMCTI 90 (FIG. 8). Finally, the temperature of the refractory article/steel rod composite 86 is elevated, first, to drive off the binder and tack the refractory particles, and then to sinter the composite 86. Finally, in accordance with well known techniques, the composite 86 is infiltrated with a low melting point metal, such as copper, to form a high strength, high impact resistant tooling insert. If the rods have not yet been trimmed off, they may be trimmed after infiltration is complete.

It should be understood that molding pattern refers to the desired surface configuration to be molded. This molding pattern may exist on a master pattern, an RTV pattern, or the like.

As already indicated, the present invention has several important advantages. In addition, the assembly 30 permits the displacement elements (rods 34) to be positioned quickly, accurately and economically, and following the addition of the refractory mix and curing of the binder, the support structure and rod assembly 30 can be quickly and easily removed. The resulting rod-reinforced green part is substantially stronger than green parts formed of refractory mix alone. This additional strength reduces the incidence of breakage of larger IPMCTI's during de-molding and also reduces distortions during subsequent furnace operations.

Numerous alternative embodiments are possible. For example, the mixture displacement elements of the present invention can be combined with the thermal control passages and other teachings disclosed in U.S. Provisional Application No. 60/079,847; filed on Mar. 27, 1998 to Hull et al; and entitled "Molding Method, Apparatus, and Device Including Use of Powder Metal Technology for Forming a Molding Tool With Thermal Control Elements." This U.S. patent application is incorporated herein by reference as if set forth in full. In this combination, if displacement rods are used, their extent of insertion into the mixture may be limited so that none of the rods extends beyond the upper most position of the thermal control passages. Alternatively, the rods may be allowed to contact the components from which the thermal control passages are formed or even to penetrate to the molding surface where their passage is not blocked by a thermal control passage element. If their depth is limited to contacting the thermal control elements, it may be unnecessary to use spacer 82 to cause the rod position to be displaced back from the contacted surface. Some refractory mixture may be added into the mold cavity prior to inserting the thermal control passage components and/or the displacement devices, then the components and/or displacement devices may be added, followed by further filling and/or redistribution of the mixture. The limiting of insertion depth of the rods might occur by use of a wire mesh with smaller spaced netting than that of the dimensions of the rods.

Other combinations of the teachings of these two applications can also be made. Combinations between this referenced application and the other applications incorporated herein by reference can also be made.

A second alternative might utilize displacement elements comprising large particles instead of rods. Standard particle sizes of $A_6$ tool steel are in the range of 10 $\mu$m to 60 $\mu$m. These larger displacement particles might have nominal diameters in the range of 0.15 mm to 4.0 mm, preferably in the range of 1 mm to 3 mm when used within the $A_6$ tool steel powder particle distribution described above. These larger particles may not have similar extents in the X, Y, and Z dimensions; instead, the particles may be elongated in one or two dimensions of these dimensions. Elongation ratios in the range of 4 to 1 are preferred. It is believed that, if packed into the mold cavity such that the elongated dimensions are oriented to be more tangent to the molding surface than perpendicular to the surface, shrinkage of the formed article can be even further reduced. The addition of these larger particles may be limited to a region spaced from the molding surface. Such limiting may occur by first laying down mixture not containing the larger particles in proximity to the surface then adding particles to the mixture in regions more remote from the surface. The particles may be limited to regions that are at least 2 mm from the molding surface and more preferably 4 mm from the surface. The larger particles may be added by hand to already deposited mixture or may be added to the mixture in advance of its deposition. As with the rods, these larger particles may consist of various materials, including for example, a high melting point steel or steel alloy such as $A_6$ tool steel. In any event, it is preferred that the melting temperature of the rod and/or larger particles be higher than that of any infiltrant material that will be used in forming the article, and any associated temperature ranges used during the infiltration process or other processes associated with production of the article.

In a third alternative, the rods and/or larger particles need not be inserted in a manner which selectively sets their position so that an approximately constant spacing between the molding surface and the displacement elements exist. Though it is believed that the optimal use of the displacement elements is to have them, at least roughly, follow the contour of the molding pattern, it is also believed that some benefits will occur even if only the upper most, or other selected, portion of the mold cavity receives displacement elements.

In a fourth alternative, it is possible to combine the displacement techniques with those disclosed in U.S. Patent No. 5,989,476 to Loackard et al., entitled "Apparatus and Methods for Fabricating Molded Refractory Articles". These combinations may, for example, use the displacement elements of the present invention while simultaneously using the direct molding process of the referenced application where the mixture is applied directly to an RP&M produced master as opposed to applying it to an RTV intermediate. Alternatively or additionally, the displacement elements of the instant application may be used in combination with the one step or simplified furnace cycling process and/or apparatus of the referenced application, wherein the removal of excess rod length can occur before or after sintering and/or infiltration is complete.

In still further alternatives, other intermediate molding elements besides RTV silicone rubber may be used. For example, using a flexible stereolithography material such as Somos 2100 manufactured by E. I. DuPont de Nemours and Company of New Castle, Del.

The articles produced according to the teachings herein may be used as for various purposes. The article may be used as an insert in an injecting molding process where the molding surfaces of the articles formed herein are also the active molding surface during injection molding. The articles may be used as inserts in a die casting process. Alternatively, the articles produced may be used a functional articles for any desired purpose including, but not limited to, prototypes, models, patterns for other types of molding or tooling processes.

While the invention has been shown and described with reference to several embodiments thereof, it will be appreciated by those having skill in the art that variations in form and detail may be made therein without departing from the spirit and scope of the invention as defined by the accompanying claims.

What is claimed is:

1. A refractory article comprising a sintered refractory mix of refractory particles and a heat fugitive organic binder, and a plurality of rods comprised of a high melting point metal, wherein at least a portion of the rods are embedded in and displace a portion of the sintered refractory mix, thereby reducing the volume of refractory mix employed.

2. A refractory article according to claim 1 wherein the article comprises a mold insert having an active tool surface, the rods having ends spaced away from the active tool surface.

3. A refractory article according to claim 2 wherein the rods are adjustably positioned to control the length of the rods projecting into the article.

4. A refractory article according to claim 1 wherein the rods have an upper and lower end, the lower end being tapered.

5. A refractory article according to claim 1 wherein the rods are distortion reducing and reinforcing, and are made of steel.

* * * * *